United States Patent
Lee

[15] 3,658,254
[45] Apr. 25, 1972

[54] LIQUID ATOMIZING APPARATUS
[72] Inventor: Aaron Lee, Miami Beach, Fla.
[73] Assignee: Chemair Corporation of America, Hialeah, Fla.
[22] Filed: May 16, 1969
[21] Appl. No.: 825,178

[52] U.S. Cl............................239/337, 239/354, 239/372, 239/572
[51] Int. Cl......................................................B05b 7/32
[58] Field of Search................239/302, 337, 372, 373, 413, 239/570, 346, 369, 398, 407, 410, 525, 530, 569, 572, 354, 401, 209; 222/394, 399, 402.1; 372/416, 570

[56] References Cited

UNITED STATES PATENTS

| | | | |
|---|---|---|---|
| 2,040,302 | 5/1936 | Fortier | 222/394 |
| 3,061,203 | 10/1962 | Kitabayashi | 222/394 X |
| 2,083,039 | 6/1937 | Searles | 239/373 X |
| 2,639,946 | 5/1953 | Cohen et al. | 239/401 |
| 2,842,399 | 7/1958 | Strahman et al. | 239/412 |
| 3,007,647 | 11/1961 | Woelfer | 239/346 X |

FOREIGN PATENTS OR APPLICATIONS

| | | | |
|---|---|---|---|
| 16,512 | 5/1956 | Germany | 222/394 |
| 311,978 | 5/1929 | Great Britain | 239/346 |

Primary Examiner—M. Henson Wood, Jr.
Assistant Examiner—Edwin D. Grant
Attorney—Jay M. Cantor

[57] ABSTRACT

A liquid spray gun for atomizing and projecting a mixture of pressurized liquid and pressurized gas propellant having a housing for hand manipulation including a manually operated combination spray nozzle, valve and a mixing junction secured in said housing. A pressurized liquid conducting tube connected to said mixing junction through a check valve having a non-reverse flow spring of predetermined resistance. A pressurized gas propellant tube connected to the mixing chamber through a second check valve having a non-reverse flow spring of predetermined lesser resistance for preventing possible improper operation of the gun.

2 Claims, 5 Drawing Figures

PATENTED APR 25 1972 3,658,254

INVENTOR.
AARON LEE
BY
Lloyd Sanders

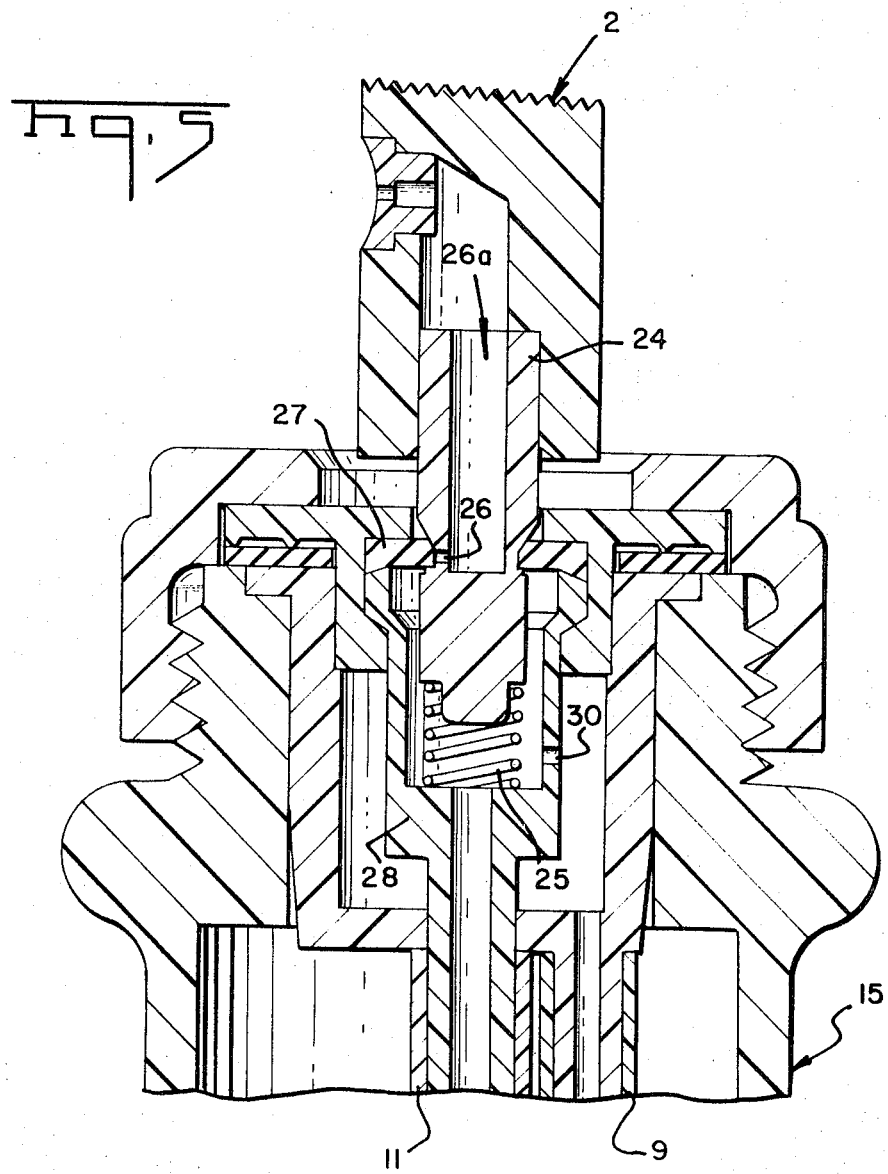

LIQUID ATOMIZING APPARATUS

This invention relates in general to a spray gun for spraying atomized liquid and gas propellant remotely connected to said gun and more particularly to a check valve means in said gun independently connected in the liquid and propellant gas supply tubes for preventing the occasional improper interchange of liquid and propellant gas in the supply tubes connected to the gun, causing "spitting" and other malfunction.

Reference is had to applicant's pending applications for Liquid Spray Apparatus, Ser. No. 788,678, and A Liquid Supply Container for a Spray Gun, Ser. No. 802,505.

Prior to this invention spray guns of this general character on occasion would "spit" non-atomized liquid which had drained into the gas propellant tube, and in addition, the liquid supply tube would drain and prevent the proper initial atomization when the gun was operated.

A principal object of the invention is the provision of a spray gun for atomizing pressurized liquid and pressurized gas propellant from a common mixing junction supplied by tubes carrying the pressurized liquid and gas respectively and including a check valve of different predetermined characteristics in series with the connection of the supply tube to the mixing junction.

A further object of the invention is the provision of a check valve having a seat on which a resilient valve member is urged by spring means on a narrow seat for preventing reverse flow of a fluid therethrough.

These and other objects and advantages in one embodiment of the invention are described and shown in the following specification and drawing, in which:

FIG. 5 is a sectional view through the nozzle assembly.

Figure 1:
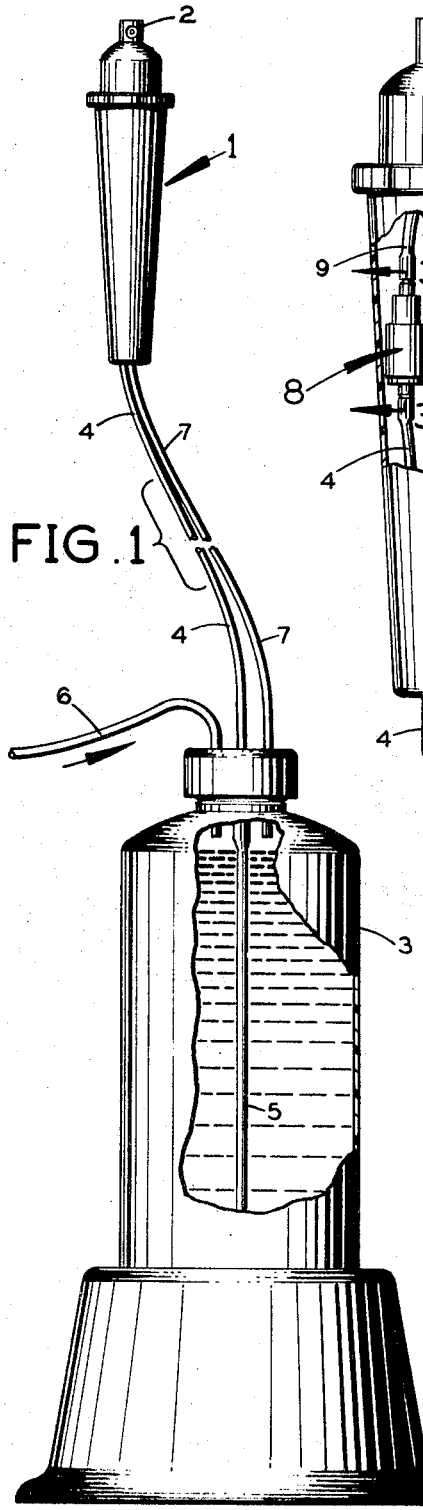
FIG. 1 illustrates the principal units of the liquid spray apparatus.

Referring to FIG. 1, a spray gun body assembly 1 having a spray nozzle 2 in the upper end thereof is fed by a dual inlet junction and nozzle valve, not shown, and connected to a liquid container 3 by a flexible liquid conducting tube 4, which is connected to dip tube 5 in container 3 extending close to the bottom thereof. A flexible tube 6 entering only the upper end portion of the container 3 is connected to a source of propellant gas, such as compressed air. A flexible propellant tube 7 has one end connected into the upper end portion only of the container 3 and the opposite end connected into the gun assembly 1 with tube 4, to be hereinafter described.

Figure 2:
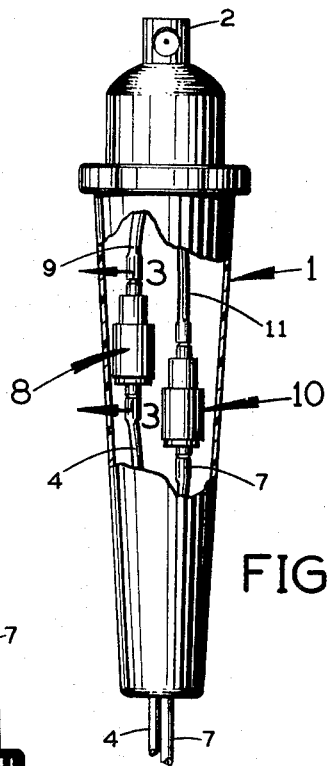
FIG. 2 is a front elevation of the spray gun shown in FIG. 1 with a portion thereof broken away.

Referring to FIG. 2, the broken away portion of gun assembly 1 shows the liquid conducting tube 4 connected to the inlet of a check valve assembly 8 with the outlet thereof connected to a flexible tube 9 terminating in a mixing junction for nozzle 2, not shown. FIG. 2 also shows the propellant or air tube 7 connected to the input of a check valve assembly 10, the same as the check valve assembly 8, except for one modification, to be hereinafter described. The outlet of check valve assembly 10 is connected by flexible tubing 11 to the aforesaid nozzle mixing junction, not shown, which feeds the nozzle 2 through a normally closed control valve, not shown, which is adapted to be operated by the manual movement of the nozzle.

Figure 3:
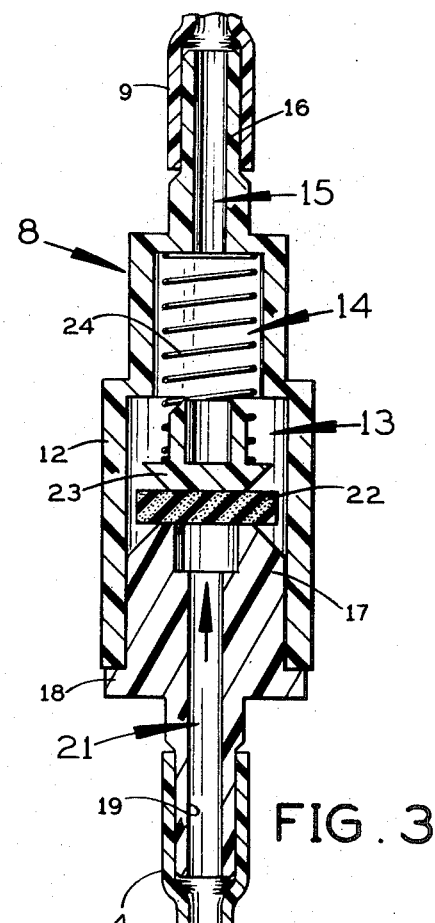
FIG. 3 is an enlarged cross-sectional elevation of one of the check valves shown in FIG. 2.
Figure 4:
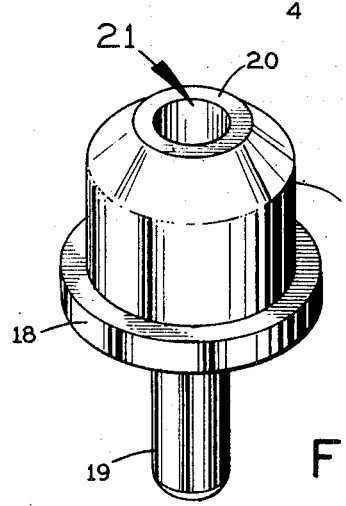
FIG. 4 is an enlarged perspective view of the valve seat shown in FIG. 3.

Referring to FIGS. 3 and 4, a check valve assembly 8 comprises a cylindrical body member 12, preferably formed from plastic material having a large diameter bore 13 at one end thereof and a medium sized bore 14 joining bore 13 and a smaller outlet bore 15 in a nipple or stem 16 joining bore 14 for frictionally retaining outlet tube 9 on the outside thereof, as shown. A cylindrical seat 17 has a flange 18 extending around the lower portion thereof, which flange terminates in an inlet nipple or stem 19 for frictionally retaining the liquid tube 4 around the outer surface thereof. The upper conical end of the seat 17 terminates in a narrow seat surface 20 formed coaxial with and around inlet bore 21, as shown.

Referring to FIGS. 3 and 4, the check valve assembly 8 has the cylindrical seat body 17 press fitted in sealed relation in bore 13 with the flange against the lower end of body member 12. A circular elastomer disc 22, having a diameter less than the bore 13, is positioned on the seat surface 20 with a cylindrical shouldered plunger 23 positioned coaxial with the axis of the valve and retained in the lower end of a coil spring 24, for urging disc 22 against seat surface 20. The upper end of the spring 24 normally is compressed a predetermined force against a shoulder in the upper end of bore 14 in the body member 12 and the upper side of disc 22.

It is now apparent that liquid under predetermined pressure will open the check valve and flow in the direction shown by arrows in FIG. 3 by raising the disc 22 against the tension spring 24 and flow around the disc and through the bore 15 and from the outlet stem 16 into tube 9.

The check valve assembly 10 is identical to the check valve 8 except the spring 24 is modified to produce a predetermined degree of lesser force against the elastomer disc 22 and hence will open for the passage of air at a slightly less predetermined pressure. This differential between the springs 8 and 10 is one of the important features of the invention, as will hereinafter be described.

Referring to FIG. 5, the spray gun assembly 2 as disclosed in my above-mentioned prior application Ser. No. 788,678 now abandoned, is operated by depressing nozzle 2. This in turn depresses tubular member 24 which has a passageway 26a opening into the nozzle, the lower end of tubular member being closed. A metering bore 26 in the wall of the member 24 is normally closed by the wall of an opening in elastomeric washer 27 through which the tubular member extends. The lower closed end of such tubular member extends. The lower closed end of such tubular member extends into a mixing chamber formed in a block member 28, the chamber being closed by the washer 27. A spring 25 in the chamber urges the member 24 into its uppermost position wherein the entrance to the metering bore, which constitutes a valve, is closed by the washer. An opening 30 in the mixing chamber wall permits the propellant gas from conduit 11 to enter and mix with the liquid entering the chamber from conduit 9. When the nozzle member 2 is depressed, the bore 26 will move away from the washer 27 permitting the propellant gas and liquid to pass therethrough and into the nozzle from which it is propelled.

In operation and under the assumption that the container 3, filled with liquid, is supplied with pressurized gas from tube 6 then the liquid will flow through tube 4 and the gas will flow through tube 7 into and through the check valve assemblies 8 and 10, respectively, and thence through tubes 9 and 11 into a common mixing junction and the nozzle operated valve means, not shown, which will atomize and discharge the liquid and air from nozzle 2 when the latter is operated.

The check valve assemblies 8 and 10 prevent the liquid and air from reverse flow in the gun when the gas pressure from tube 6 into the container is stopped. Without the presence of the check valve assembly 8 in the liquid tube, some liquid in the junction would contaminate the gas tube 11 and result in a "spitting" of non-atomized liquid when pressure into the container is resumed and the nozzle operated. This condition is completely eliminated by the use of the check valve assembly 8, which also prevents any reverse flow of liquid into tubes 11 and 7 by gravity.

Another difficulty causing "spitting" of non-atomized liquid from the nozzle results from the liquid entering the junction prior to sufficient gas pressure from tube 11 when the nozzle valve is operated, thus forcing non-atomized liquid from the nozzle when rapidly operated operated. This difficulty is overcome by providing a spring in gas valve assembly 10 having less force than the spring in liquid valve assembly 8. Thus, as the pressure builds in both the liquid and gas lines, the gas will open check valve assembly 10 a fraction of a second before the liquid opens check valve assembly 8, thus providing gas flow through the junction and from the nozzle slightly before the arrival of the liquid and thus providing the initial atomizing of the liquid projected from the nozzle when the latter is operated.

This invention comprehends modifications in construction within the features and spirit of the above specification.

Having described my invention, I claim:

1. A spray gun for projecting an atomized mixture of pressurized liquid and propellant gas comprising a means forming a hollow body for hand manipulation,
   a spray nozzle projecting from said body connected to a normally closed nozzle valve means secured in said body for connecting said liquid and said gas into and from said nozzle when said valve means is operated,
   a junction means connected to said valve means having independent liquid and gas inlet means adapted for mixing and conducting said liquid and said gas into said nozzle valve means,
   a liquid check valve in said body having an inlet and outlet with the outlet thereof connected to said liquid inlet means of said junction means for preventing reverse flow of said liquid,
   a gas check valve in said body having an inlet and outlet with the outlet thereof connected to said gas inlet means of said junction means for preventing the reverse flow of said gas,
   a source of pressurized liquid
   a source of pressurized gas,
   an elongated flexible tube connecting the said inlet of said liquid check valve to said source of liquid,
   a second elongated flexible tube connecting the said inlet of said gas vale to said source of gas said gas check valve being provided with means for rendering it effective to permit gas flow to the nozzle prior to commencement of liquid flow when the nozzle is first opened, whereby said nozzle is prevented from projecting non-atomized said liquid when said nozzle valve means is initially operated.

2. In a spray gun of the character described a normally closed nozzle valve having an inlet and outlet means in said gun with the outlet thereof connected to a nozzle for projecting atomized liquid therefrom when said valve is manually operated,
   a junction chamber having the outlet thereof connected to said inlet means of said valve,
   said chamber including independent fluid and gas inlet means,
   a fluid check valve having an inlet and outlet with the outlet thereof connected to said inlet means of said chamber,
   a gas check valve having an inlet and outlet with the outlet thereof connected to said gas inlet means of said chamber,
   a source of pressurized liquid connected to the said inlet of said fluid check valve,
   a source of pressurized gas connected to the said inlet of said gas check valve whereby the said check valves will prevent the momentary projection of non-atomized said fluid when said nozzle valve is operated, said liquid valve having therein a closure spring of predetermined tension for holding same in closed position and said gas valve having a closure spring therein of predetermined lesser tension for holding same in closed position whereby said gas will flow through said nozzle prior to the flow of said liquid when said nozzle valve is operated.

* * * * *